United States Patent [19]

Dann

[11] 4,088,418
[45] May 9, 1978

[54] CHUCK FOR DRIVING TAP OR LIKE ROTARY TOOL

[75] Inventor: Robert Sidney Dann, Coventry, England

[73] Assignee: B. O. Morris Limited, West Midlands, England

[21] Appl. No.: 791,788

[22] Filed: Apr. 28, 1977

[30] Foreign Application Priority Data

Apr. 30, 1976 United Kingdom ............... 17777/76
Sep. 22, 1976 United Kingdom ............... 39201/76

[51] Int. Cl.² ........................ B23B 31/02; B23G 5/16
[52] U.S. Cl. ................................... 408/139; 10/89 F; 10/135 R; 64/29
[58] Field of Search ............ 408/139; 10/135 R, 89 F; 64/29

[56] References Cited

U.S. PATENT DOCUMENTS 1,657,274 1/1928 Niedhammer ............................. 64/29
1,909,366 5/1933 Koza ........................................ 64/29

Primary Examiner—Gil Weidenfeld
Attorney, Agent, or Firm—Gifford, Chandler, VanOphem, Sheridan & Sprinkle

[57] ABSTRACT

A tap-driving chuck, having a driven shaft and a driving sleeve spaced co-axially from the shaft to provide an annular space closed at one end by an annular flange extending from the sleeve. Several circumferentially-spaced balls are positioned in the annular space and are urged by a spring into shallow depressions formed in the annular flange. The balls are each located in slots in a circumferential edge of a flange on the shaft. A driving torque applied to the sleeve is transmitted by the balls to the shaft only while the balls are urged by the spring into the depressions. The balls are lifted against the spring force out of the depressions when the torque being transmitted reaches an upper limiting value, the sleeve then turning idly past the balls.

6 Claims, 6 Drawing Figures

CHUCK FOR DRIVING TAP OR LIKE ROTARY TOOL

The invention relates to a chuck for driving a tap or like rotary tool and is particularly concerned with a chuck having a clutch device operative between a driving member and a tool-holding member of the chuck and arranged to be disengaged when the torque transmitted between the driving member and the tool-holding member increases beyond a limiting value. Such excessive torque would arise when a tap hits an obstruction in a hole being tapped, for example the bottom of a shallow hole, or a blunt tap is used. The provision of the clutch device therefore reduces the liklihood of tap breakage.

A known chuck of the kind having a clutch device which will become disengaged when the torque being transmitted reaches a limiting value includes a clutch of the dog-clutch type. This requires dog member of special shape and complementary dog teeth. An object of the invention is to provide a chuck which does not require dog members of special shape and is therefore much less expensive to make and easier to assemble and more rapid in operation.

According to the invention, a chuck for driving a tap or like rotary tool comprises a rotatable shaft having socket-defining means therein co-axial with the axis of rotation of the shaft, the socket-defining means being shaped to impart positive rotational drive to the tap or other tool and to retain the latter in the chuck during a cutting operation, a driving sleeve mounted co-axially on the shaft and spaced radially therefrom to leave an annular space between the shaft and the sleeve, the annular space being closed at one end by a first flange extending from one of the sleeve and the shaft, at leave one drive-transmitting member positioned in the annular space and urged by spring means into a shallow depression formed in said first flange, the drive-transmitting member extending through an open-ended slot in a circumferential edge of a second flange on the other of the sleeve and the shaft, the slot having a side wall extending in a direction radially of said second flange, or parallel to a radius of said second flange, and forming a driving surface against which the drive-transmitting member abuts on rotation of the sleeve, whereby a driving torque applied to the sleeve will be transmitted by the drive-transmitting member or members to the shaft while the or each drive-transmitting member is urged by the spring means into the or a respective shallow depression in said first flange, the force of the spring means permitting the drive-transmitting member to be lifted against the spring force out of the shallow depression in said first flange when the torque being transmitted between the sleeve and the shaft exceeds a limiting value and thereby to interrupt the transmission of torque between the sleeve and the shaft.

The other side wall of the slot is conveniently sloped away from said radial side wall, whereby on turning the sleeve in the reverse direction, the drive-transmitting member will tend to wedge between said other side wall of the slot and said one of the sleeve and the shaft and hence effect driving of the shaft in the said reverse direction, whereby the tap or other tool will be driven away from a workpiece.

Conveniently there are a plurality of circuumferentially-spaced drive-transmitting members, associated shallow depressions in said first flange in which respective drive-transmitting members are locatable and associated slots in said second flange through which respective drive-transmitting members extend, thereby to impart torque evenly distributed circumferentially around the shaft.

In one embodiment in accordance with the invention, the or each drive-transmitting member is a cylindrical pin having a part-spherical end engageable with the or a shallow depression in said first flange.

In another embodiment in accordance with the invention the or each drive-transmitting member is a ball bearing or other hardened ball and the or each slot in said second flange has a side wall parallel to a radial centre-line through the slot and also to the longitudinal axis of said second flange, whereby when the sleeve is rotated, the said side wall of the or each slot will engage the ball or respective ball and hence drive the shaft as long as the spring means holds the ball or balls in the shallow depression or depressions, in said first flange, but when the torque being transmitted between the sleeve and the shaft reaches a predetermined value, the ball or balls will ride out of the shallow depression or depressions against the force of the spring means, thereby interrupting the transmission of torque between the sleeve and the shaft.

The other side wall of the or each slot in said second flange is conveniently parallel to the radial centre-line through the slot but is also inclined to a plane parallel to the longitudinal axis of said second flange, whereby on turning the sleeve in the reverse direction, the or each ball will be engaged by the said other side wall of the slot or the respective slot and will be held by the wedging effect of the inclined side wall in the or the respective shallow depression, thereby positively transmitting torque between the sleeve and the shaft and hence to effect driving of the shaft in said reverse direction, whereby the tap or other tool will be driven away from the workpiece.

By way of example, two embodiments of tap chuck in accordance with the invention are now described with reference to the accompanying drawings, in which.

Figure 1:
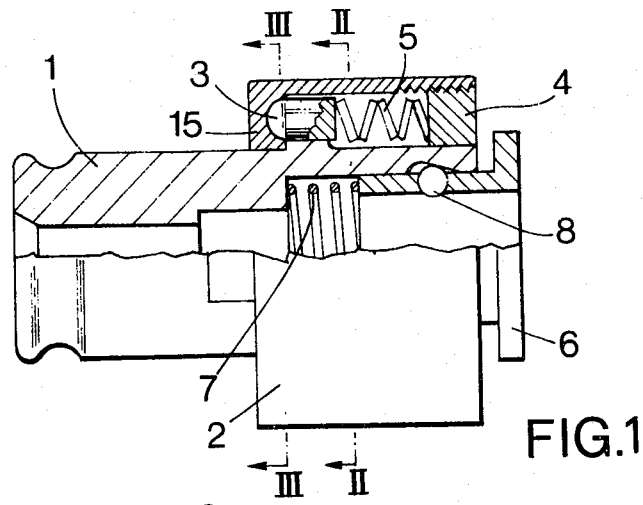
FIG. 1 is an axial section through the assembled chuck of the first embodiment.
Figure 2:
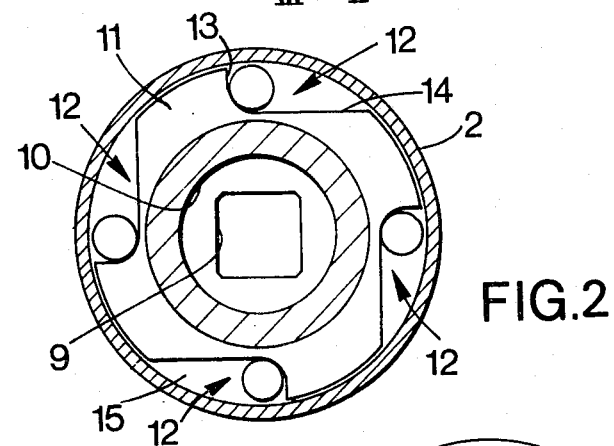
FIG. 2 is a view of the shaft only in the direction of arrow II in FIG. 1.

Referring to FIGS. 1-4, the first chuck comprises the shaft 1, a co-axial driving sleeve 2 and a plurality, e.g., four, of drive-transmitting pins 3, the aforesaid drive-transmitting members. The shaft 1 shown in FIGS. 1 and 2 only has a throughway including a square central portion 9 into which a complementarily-shaped shank of a tap (not shown) is inserted and a counterbore portion 10 which, together with the portion 9, constitutes the aforesaid socket-defining means and receives a bush 6 (see FIG. 1) into which the tap is inserted. The bush 6 is held by a locking ball 8 in a recess in the counterbore portion 10 by wedging action produced by a helical compression spring 7. The shaft 1 has an outwardly-extending flange 11 which is formed with four circumferentially-spaced open-ended slots 12 each bounded by a face 13 extending parallel to a radius of the flange 11 and a substantially chordwise face 14 which extends away from the face 13.

Figure 3:
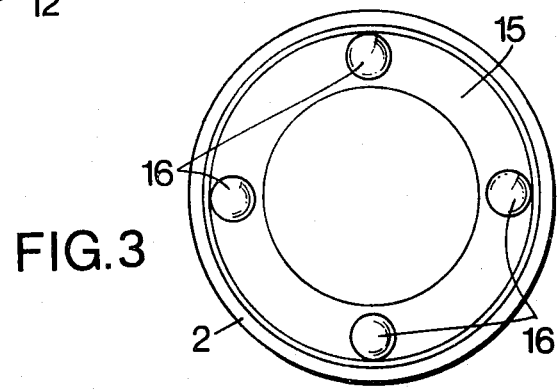
FIG. 3 is a transverse section of sleeve only on the line III—III in FIG. 1.

The sleeve 2 shown only in FIGS. 1 and 3 comprises a cylindrical wall radially spaced from the shaft 1 to provide an annular space between the cylindrical wall and the shaft 1. The annular space is closed at one end by means of an inwardly-directed flange 15 formed on the sleeve 2. The inner end face of the flange 15 has four part-spherical depressions 16 formed therein and spaced apart equidistant from each other in the circumferential direction.

Referring to FIG. 1 only, each drive-transmitting pin 3 has a part-spherical end which is locatable in one of the spherical recesses 16 in the flange 15 of the sleeve 2 and is urged into the depression by means of an annular spring 5, acting at one end on the outer ends of the drive-transmitting pins 3, i.e., not the part-spherical ends, and at the other end against a retaining ring 4 secured, for example by a screw thread, to the outer end of the cylindrical wall of the sleeve 2.

The chuck is driven by rotating the sleeve 2. Under normal driving torque, the drive-transmitting pins 3 will be located in their respective part-spherical recesses 16 and will be pushed by the flange 15 in the circumferential direction to push the drive-transmitting pins 3 against the respective substantially radial faces 13 of the slots 12 in the flange 11 on the shaft. The shaft 11 will therefore be rotated and this will through the non-circular central portion 9 of the throughway transmit the driving torque to the tap. If the torque should increase above a limiting value, for example due to the tap hitting an obstruction such as a shallow hole being tapped or if the tap should be blunt, the increased torque will cause the drive-transmitting pins 3 to tip and thereby to be moved out of the part-spherical depressions 16 against the spring force of the spring or springs 5. The spring force or the adjustment of the locking ring 4 is such that the drive-transmitting pins 3 will ride out of their respective part-spherical depressions 16 at a desired limiting torque. When the drive-transmitting pins 3 are out of their respective sockets 16 and rest against the inner face of the flange 15, they can no longer transmit torque as the flange 15 of the sleeve 2 will slide idly past the part-spherical ends of the drive-transmitting pins 3. Thus torque will not be transmitted to the shaft 1 and the chuck will freewheel. Each time a spherical depression 16 passes beneath a drive-transmitting pin 3, the latter will temporarily be urged by the spring 5 into the depression 16; but so long as the torque is above the limiting value, the drive-transmitting pin 3 will again ride out of the depression 16 as the sleeve 2 is rotated.

Another feature of the chuck is that when the sleeve 2 is turned in the reverse direction, the drive-transmitting pins 3 will tend to ride on the respective chordwise faces 14 and become wedged between the respective faces 14 and the inner cylindrical face of the sleeve 2 and so drive will be transmitted from the sleeve 2 to the shaft 1 and hence the shaft 1 will drive the tap out of the hole.

Figure 4:
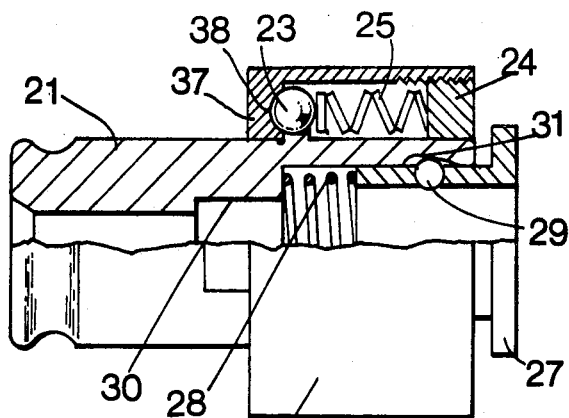
FIG. 4 is an axial section, similar to FIG. 1, through the assembled chuck of the second embodiment.
Figure 5:
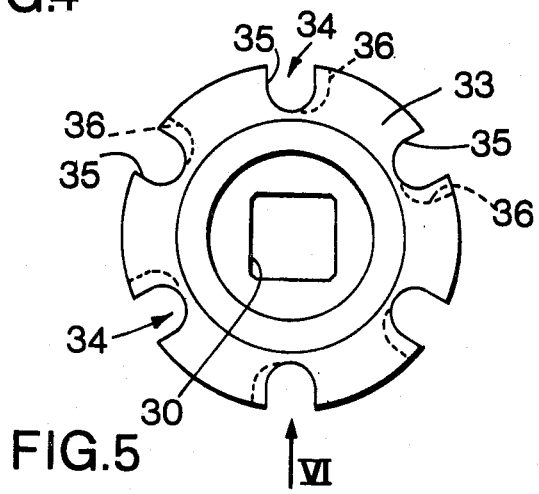
FIG. 5 is a view of the shaft only in the direction of arrow V in FIG. 4.
Figure 6:
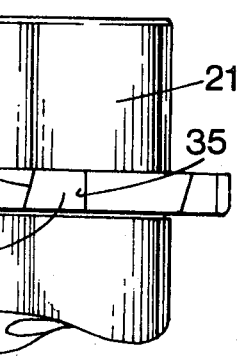
FIG. 6 is an elevation of the shaft only in the direction of arrow VI in FIG. 5.

Referring to FIGS. 4–6, the second chuck comprises the shaft 21, a coaxial driving sleeve 22 and a plurality, e.g., six, of drive-transmitting balls 23. These may be ball bearings or other hardened balls. The shaft 21 has a throughway including a square central portion 30 into which a complementarily-shaped shank of a tap (not shown) is inserted and a counterbored portion 31 which, together with the portion 30, constitutes the aforesaid socket-defining means and receives a bush 27 (see FIG. 4) into which the tap is inserted. The bush 27 is held by a locking ball 29 in a recess in the counterbored portion 31 by a helical compression spring 28. The shaft 21 has an outwardly-extending flange 33 which is formed with six circumferentially-spaced open-ended slots 34 each bounded by a pair of spaced side edges 35, 36 substantially parallel with a radial centre-line through the slot 34. One of each of the side edges 35 is also parallel to the radial centre-line in the axial direction of the flange 33, but the other of each of the side edges 36 is inclined to the radial direction as shown in FIGS. 5 and 6.

The sleeve 32 comprises a cylindrical wall radially spaced from the shaft 21 to define an anular space between the cylindrical wall and the shaft. The annular space is closed at one end by means of an inwardly-directed flange 37 formed on the sleeve 22. The inner end face of the flange 37 has six part-spherical depressions 38 formed therein and spaced apart equidistant from each other in the circumferential direction. A transverse section through the sleeve 32 has not been shown as this will be similar to the transverse section through the sleeve of the first chuck and shown in FIG. 3.

Referring to FIG. 4, each drive-transmitting ball 23 is locatable in one of the part-spherical depressions 38 in the flange 37 of the sleeve 22 and is urged into the depression by means of a plurality of annular springs 24, such as Belleville washers, or by a helical spring, acting at one end on a washer 26 engaging the balls 23 and at the other end on a retaining ring 24 secured, for example by a screw thread, to the outer end of the cylindrical wall of the sleeve 22.

The chuck is driven by rotating the sleeve 22. Under normal driving torque, the drive-transmitting balls 23 will be located in their respective part-spherical depressions 38 and will be pushed by the flange 37 in the circumferential direction to push the drive-transmitting balls 23 against the respective substantially radial faces 35 of the slots 34 in the flange 33 on the shaft 21. The shaft 21 will therefore be rotated and this will through the non-circular central portion 30 of the throughway transmit the driving torque to the tap. If the torque should increase above a limiting value, for example due to the tap hitting an obstruction such as a shallow hole being tapped or if the tap should be blunt, the increased torque will cause the drive-transmitting balls 23 to ride out of the part-spherical depressions 38 against the spring force of the springs 25. The springs force set by the adjustment of the locking ring 24 is such that the drive-transmitting balls 23 will ride out of their respective part-spherical depressions 38 when the torque reaches a particular limiting value. When the drive-transmitting balls 23 have ridden out of their respective depressions 38 and rest against the inner face of the flange 37, they can no longer transmit torque as the flange 37 of the sleeve 22 will slide idly past the drive-transmitting balls 23. Thus torque will not be transmitted to the shaft 21 and the chuck will freewheel. Each time a part-spherical depression 38 passes beneath the drive-transmitting balls 23, the latter will temporarily be urged by the springs 25 into the respective depressions 38; but so long as the torque is above the limiting value, the drive-transmitting balls 23 will again ride out of the depressions 38 as the sleeve 22 is rotated.

Another feature of the chuck is that when the sleeve 22 is turned in the reverse direction, the drive-transmitting balls 23 will engage the inclined faces 36 of the respective slots 34. Due to the wedge effect of the inclined faces 36 there will be a component of the reaction on each face 36 in a circumferential direction and a component pushing the balls 23 axially of the sleeve 22 into the respective depressions 38 and so drive will be transmitted from the sleeve 22 to the shaft 21 and hence the shaft 21 will drive the tap out of the hole.

The chucks described and illustrated are therefore slipping clutches to prevent damage to the tap if excessive torque should occur and they also provide positive drive when the sleeve is driven in the reverse direction thereby to withdraw the tap from the hole being tapped.

Although the chucks described and illustrated, each of the flanges 15 or 37 providing the part-spherical depressions 16 or 38 is integral with the sleeve 2 or 32 and the flange 11 or 33 providing the slots 12 or 34 is integral with the shaft 1 or 21, the flange providing the part-spherical depressions could be integral with the shaft and the flange providing the open-ended slots 12 could be integral with the sleeve but in that case the side faces 12 and 13 or 35 and 36 of each slot would have to be interchanged to provide normal drive and reverse drive in the correction directions.

What I claim as my invention and desire to secure by Letters Patent of the United States is:

1. A chuck for driving a tap or like rotary tool comprising a rotatable shaft having socket-defining means therein co-axial with the axis of rotation of the shaft, the socket-defining means being shaped to impart positive rotational drive to the tap or other tool and to retain the latter in the chuck during a cutting operation, a driving sleeve mounted co-axially on the shaft and spaced radially therefrom to leave an annular space between the shaft and the sleeve, a first flange extending from one of the sleeve and the shaft closing one end of the annular space, at least one drive-transmitting member positioned in the annular space, spring means acting to urge said drive-transmitting member into a shallow depression formed in said first flange, a second flange on the other of the sleeve and the shaft and having an open-ended slot in the circumferential edge of said second flange, said slot having said drive-transmitting member positioned therein, said slot having a side wall extending in a direction radially of said second flange, and forming of a driving surface against which said drive-transmitting member abuts on rotation of said sleeve, whereby a driving torque applied to said sleeve will be transmitted by said drive-transmitting member to said shaft while said drive-transmitting member is urged by said spring means into said shallow depression in said first flange, the force of said spring means permitting said drive-transmitting member to be lifted against the spring force out of said shallow depression in said first flange when the torque being transmitted between said sleeve and said shaft exceeds a limiting value and thereby to interrupt the transmission of torque between said sleeve and said shaft.

2. A chuck as claimed in claim 1 in which said other sid wall of said slot is sloped away from said radial side wall, whereby on turning said sleeve in the reverse direction, said drive-transmitting member will tend to wedge between said other side wall of said slot and said one of the sleeve and the shaft and hence effect driving of said shaft in said reverse direction, whereby the tool will be driven away from a workpiece.

3. A chuck as claimed in claim 1 in which said drive-transmitting member is a cylindrical pin having a part-spherical end engageable with said shallow depression in said first flange.

4. A chuck as claimed in claim 1 in which said drive-transmitting member is a ball and said slot in said second flange has a side wall parallel to a radial centre-line through said slot and also to the longitudinal axis of said second flange, whereby when said sleeve is rotated, said side wall of said slot will engage said ball and hence drive said shaft as long as said spring means holds said ball in said shallow depression in said first flange, but when the torque being transmitted between said sleeve and said shaft reaches a predetermined value, said ball will ride out of said shallow depression against the force of said spring means, thereby interrupting the transmission of torque between said sleeve and said shaft.

5. A chuck as claimed in claim 4 in which said other side of said slot in said second flange is parallel to the radial centre-line through said slot and is also inclined to a plane parallel to the longitudinal axis of said second flange, whereby on turning said sleeve in the reverse direction, said ball will be engaged by said other side wall of said slot and will be held by the wedging effect of the inclined side wall in said shallow depression, thereby positively transmitting torque between said sleeve and said shaft and hence to effect driving of said shaft in said reverse direction, whereby said tool will be driven away from a workpiece.

6. A chuck as claimed in claim 1 in which there is a plurality of drive-transmitting members circumferentially-spaced apart in said annular space at substantially equal intervals and the same number of shallow depressions in said first flange and the same member of slots in said second flange as there are drive-transmitting members.

* * * * *

UNITED STATES PATENT AND TRADEMARK OFFICE
CERTIFICATE OF CORRECTION

PATENT NO. : 4,088,418
DATED : May 9, 1978
INVENTOR(S) : Robert Sidney Dann

It is certified that error appears in the above-identified patent and that said Letters Patent are hereby corrected as shown below:

Col. 1, line 15, delete "liklihood" and insert --likelihood-- therefor;

Col. 1, line 42, after "other", insert --end--;

Col. 2, line 54, delete "1-4" and insert --1-3--;

Col. 5, line 4, delete "a" (first occurrence) and insert --the-- therefor;

Col. 5, line 14, after "although", insert --in--;

Col. 5, line 36, delete "sleeve" and insert --sleeves-- therefor; and

Col. 6, line 8, delete "sid" and insert --side-- therefor.

Signed and Sealed this

Third Day of October 1978

[SEAL]

Attest:

RUTH C. MASON
Attesting Officer

DONALD W. BANNER
Commissioner of Patents and Trademarks